United States Patent [19]

Laverick

[11] Patent Number: 4,578,863
[45] Date of Patent: Apr. 1, 1986

[54] FLEXIBLE FILAMENT VEGETATION CUTTER

[75] Inventor: Raymond R. Laverick, Bishop Auckland, England

[73] Assignee: Black & Decker Inc., Newark, Del.

[21] Appl. No.: 670,379

[22] Filed: Nov. 9, 1984

[30] Foreign Application Priority Data

Nov. 11, 1983 [GB] United Kingdom ............... 8330228

[51] Int. Cl.$^4$ ............................................. A01D 50/00
[52] U.S. Cl. ........................................ 30/276; 56/12.7
[58] Field of Search .................... 30/276, 349; 56/12.7

[56] References Cited

U.S. PATENT DOCUMENTS

| | | | |
|---|---|---|---|
| 3,018,602 | 1/1962 | Diesterweg | 56/12.7 X |
| 3,664,102 | 5/1972 | Reber | 56/12.7 X |
| 3,928,911 | 12/1975 | Pittinger | 30/276 |
| 4,285,128 | 8/1981 | Schnell | 30/276 |
| 4,338,719 | 7/1982 | Burkholder | 30/276 |
| 4,367,587 | 1/1983 | Kilmer | 30/276 |
| 4,369,577 | 1/1983 | Gise | 30/276 |
| 4,452,033 | 6/1984 | Scramuzza | 56/12.7 |

FOREIGN PATENT DOCUMENTS

| | | |
|---|---|---|
| 0046050 | 2/1982 | European Pat. Off. . |
| 2828425 | 1/1980 | Fed. Rep. of Germany . |
| 2930469 | 2/1980 | Fed. Rep. of Germany . |

*Primary Examiner*—Jimmy C. Peters
*Attorney, Agent, or Firm*—Ronald B. Sherer; Edward D. Murphy; Harold Weinstein

[57] ABSTRACT

A vegetation trimmer incorporating a cutting filament (24) that is rotated by a head (9) drivingly coupled by a belt drive (26) for example to a driving motor. Feed of filament to the head 9 is from a reel mounted in a handle (14) by which the trimmer is supported, the feed of filament from the reel being under the control of the user.

21 Claims, 3 Drawing Figures

FLEXIBLE FILAMENT VEGETATION CUTTER

FIELD OF THE INVENTION

This invention relates to vegetation cutters and has particular reference to such cutters that employ a length of flexible filament as the cutting element and are intended to be hand-held by a user.

BACKGROUND OF THE INVENTION

Many forms of such cutters incorporate a reel on which the flexible filament is wound and from which the actual cutting length extends. During use, the cutting length becomes worn and ultimately breaks at some point along its length and it is then necessary to withdraw a further length of filament from the reel to restore the cutting length to its original value. The withdrawal of filament from the reel can be effected manually but, in many cases, a mechanism controlled by the user is provided. The mechanism, when actuated by the user, allows a controlled length of filament to be withdrawn from the reel by the action of centrifugal force or by the feeding action of a rotatable reel.

The mechanism may be mounted upon a shaft carrying, at one end, a rotatable head which, in use, rapidly rotates the cutting length, and at the other end, a carrying handle by which the user supports and guides the cutter. In such a case, the filament, after leaving the reel, passes down the shaft to the head via a passage through the armature shaft of an electric motor. The head is directly attached to the shaft and includes a passageway that extends radially outwards from the axis of rotation of the shaft. This construction is expensive to produce and requires that the head shall rotate at the same speed as the motor.

SUMMARY OF THE INVENTION

According to the present invention, a vegetation cutter having a cutting element in the form of a flexible filament includes a supply reel of filament, the latter extending from the reel to a cutter head from which a length of the filament extends to form the cutting element, the head being rotatably mounted and coupled to a driving motor by means of a belt drive or the equivalent.

In one embodiment of the invention, the cutter head incorporates an arcuate guide for guiding filament from a feed point to an exit in the cutter head from which the cutting length extends.

Preferably, the guide or at least the operative surface thereof is of a material with a low coefficient of friction, for example P.T.F.E..

Means may be provided for controlling feed of filament from the reel and such means may permit feed to occur in predetermined lengths.

BRIEF DESCRIPTION OF THE DRAWINGS

By way of example only, an embodiment of the invention will now be described in greater detail with reference to the accompanying drawings of which.

DETAILED DESCRIPTION OF THE PREFERRED EMBODIMENT

Figure 1:
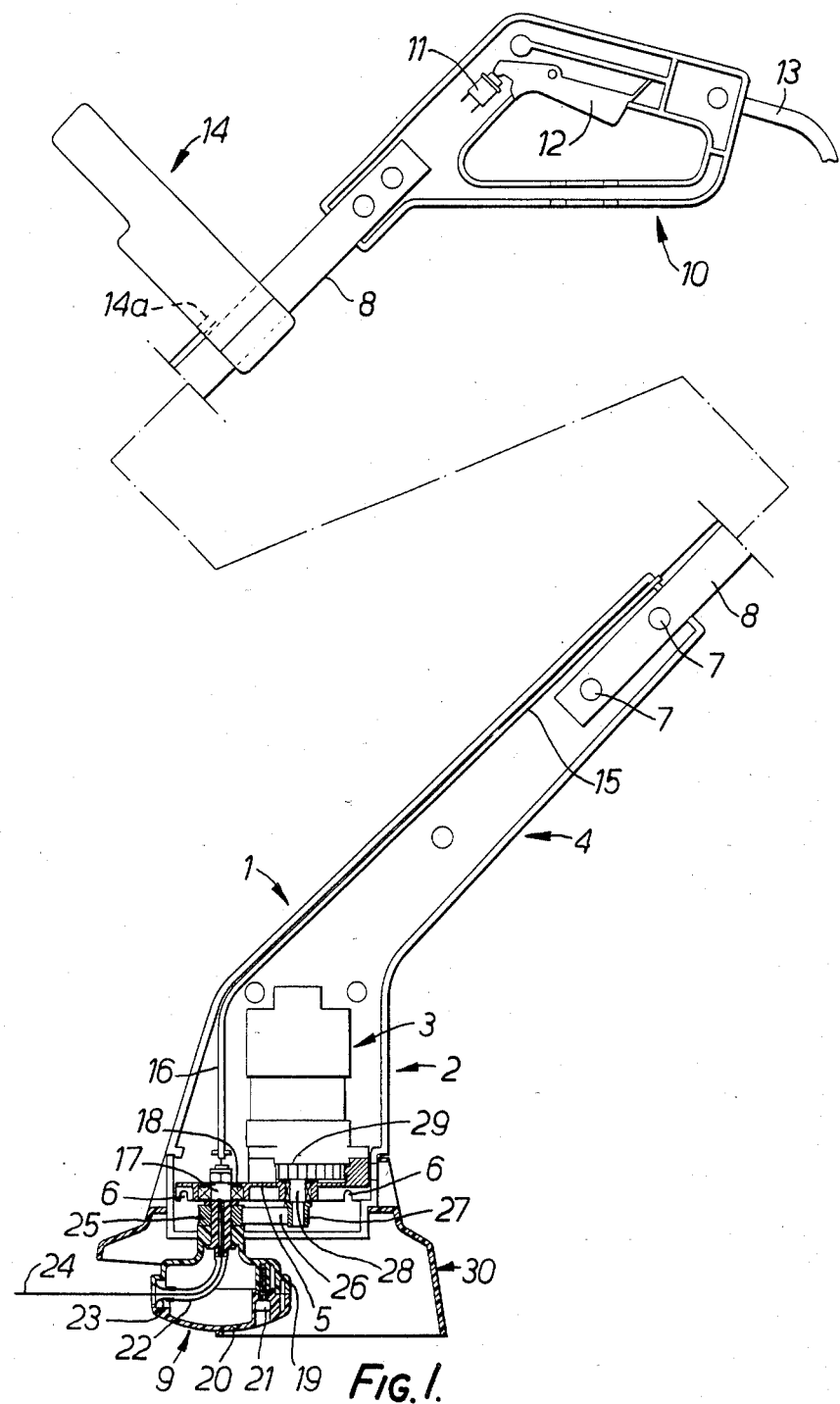
FIG. 1 is a side elevation in diagrammatic form with certain components removed.
Figure 2:
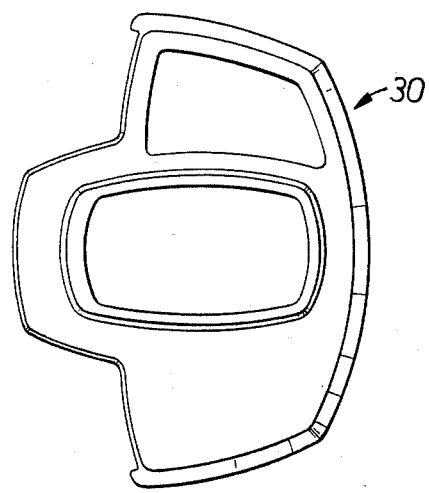
FIG. 2 is a plan view of a component of the embodiment.
Figure 3:
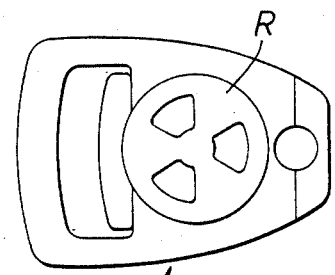
FIG. 3 is a plan view of another component.

The embodiment comprises a cutter head 1 of the so-called clam shell construction with a lower portion 2 housing an electric driving motor unit 3 and an upper portion 4 that is upwardly inclined with respect to the lower portion as can be seen from FIG. 1.

The clam shell halves of which only one is shown in FIG. 1 are of a suitable plastics material for example ABS and their mating edges are of a tongue and groove connection to ensure accurate location and to give a degree of rigidity to the assembly.

The interior surfaces of the clam shell halves are formed with ribs (not shown) which together locate and support a base plate 5 that forms part of the motor unit 3. The motor unit is placed in position in one clam shell half being located by the ribs therein and then, after the other half shell has been positioned on the first half, is secured in place by screws that pass through the walls of the shell halves and engage slots 6 in the lower face of the base plate 5.

The upper interior surfaces of the upper portions 4 of the clam shell halves are formed with internally extending screw bosses which locate in diametral holes 7 in a metal shaft 8 that extends into the portion 4 as shown in FIG. 1 and forms a supporting shaft for the cutter head 1. The lower end of the shaft 8 extends into the portion 4 and is secured in place after assembly of the clam shell halves by screws passed through the bosses and the shaft which is thus held both axially and longitudinally.

The upper end of the shaft 8 extends into a handle 10 also of clam shell construction. The upper end of the shaft 8 is secured to the handle clam shell halves in the same manner as the lower end.

The handle 10 accommodates an electrical switch indicated as block 11 and which controls the supply of electric power to the motor unit 3 via a control lead (not shown) which passes from the handle 6 down inside the shaft 8 to the cutter head 1. The switch 11 is operated by a user controlled switching lever 12 pivotally attached to the handle 10. Power to the tool is supplied via a drop-lead part of which is shown at 13. The clam shell halves of the handle are also made of a suitable plastics material, for example ABS.

Mounted on the shaft 8 adjacent the handle 10 is a second handle 14 that accommodates a reel R containing a supply of flexible filament and a mechanism for regulating the feed of filament from the reel. Details of the mechanism are given below. The second handle 14 enables the user to support and guide the tool more easily. Filament of a suitable plastics material is fed from the reel through an eyelet 14a (shown in dotted lines) on the handle 14 down alongside the shaft 8 to a guide tube 15 inside the cutter head 1. The tube terminates adjacent the base plate 5 as can be seen from FIG. 1.

The lower portion 16 of the guide tube 15 is aligned with the bore of a spindle 17 rotatably mounted in the base plate 5 by means of bearings shown at 18. The spindle 17 extends downwardly beyond the base plate 5 and carries, at its lower end, a driving head 9. the head 9 is of generally cylinder form comprising an upper half 19 and a lower half 20 secured together by three screws one of which is shown at 21. The head 9 is also of a plastics material and it accommodates a guide tube 22 one end of which fits over a nipple formed at the lower end of spindle 17. The other end of guide tube 22 is joined to a funnel-like termination 23 secured in the side wall of the head 9. As can be seen from FIG. 1, the tube 22 is of gently curved arcuate form changing direction from a position axially aligned with the bore in the spindle 17 to a position that extends radially outwardly, the mouth of the termination 23 being laterally spaced from the axis of rotation of the spindle 17 and the head 9.

Filament from the guide tube 15 passes through the bore in the spindle 17 and through guide tube 22 exiting from the termination as indicated at 24. That length of filament external of the head 9 is the cutting length as will be described below. The tube 22 thus guides the filament to follow a change in direction from the axially aligned orientation to the radial orientation.

For reasons that will be become evident below, the tube 22 is of a material with a lower coefficient of friction, for example PTFE. Alternatively, the interior of the tube may be lined or faced with such a material. It is not essential to employ a tubular guide, other forms are possible but they must provide the guiding and the changes in direction referred to above.

Also mounted upon the spindle 17 is a pulley 25 drivingly coupled by a drive belt 26 to drive pulley 27 on the output shaft 28 of the drive unit 3. The output shaft 28 is actually the armature shaft of the electric motor and is supported for rotation in the base plate 5 by means of bearings. Also mounted upon the shaft 28 just above the base plate 5 is a fan 29 that, on rotation of the shaft draws air through the motor to cool the latter. Air may be drawn into the head 1 via air inlets (not shown) in the latter, the air exiting from the head via apertures in the clam shell halves adjacent the fan 29.

As has been stated above, the second handle 14 accommodates a reel on which is wound a supply of filament. The reel is freely rotatable in the handle 14 but is normally located against rotation by a lock that is released by a user when required to allow filament to be fed from the reel to the head 9. The lock incorporates a mechanism that allows only a predetermined length of filament to be fed from the reel when the lock is released by a user.

More detail of the construction and operation of the handle 14 and the lock are found in European Patent Application No. 0 046 050 (81.303566.4) the contents of which are hereby incorporated into the present disclosure by reference.

To use the cutter, the user first ensures that a length of filament has been fed from the reel to the tube 22 and emerges therefrom as indicated at 24. The motor 1 is then energised by actuating the switch 11 in the handle 10 by means of lever 12. This causes the motor to rotate the head 9 and the cutting length 24 is rotated rapidly in a horizontal plane about the axis of rotation of the spindle 17. The filament between the head 9 and the reel is held taut by the action of centrifugal force on the portion 24 so that, when the lock is released by the user, filament is drawn off the reel thereby increasing the length of the portion 24. In that way, the length of the portion 24 can be maintained constant despite breakages and wear that occur during use. Thus, the filament may be fed from the reel whilst the cutter is in use. Alternatively, the user can, of course, stop the motor, release the lock and manually withdraw filament from the reel by grasping the exposed portion 24 and pulling.

The maximum length of the portion 24 is normally controlled by a cutting blade located within a filament guard 30 fixed to the head 1. The guard 30 provides a degree of protection for the user as it forms a shield that extends over a part only of the rotational path of the portion 24, the latter being left exposed over the remainder of its path to enable it to effect cutting of vegetation.

The guard 30 is detachably secured to the lower part of the cutterhead unit 1 in any suitable manner. For example, the front of the lower end of the unit 1 may be formed with a surface with which a corresponding surface on the guard can be interlocked after which the guard is secured in position by a screw located at the rear of the unit and the guard.

It will be appreciated that, as the head 9 rotates it imparts a twist to the filament which causes the latter to become somewhat less flexible and it is found that the filament tends to rub against the interior surface of the guide tube 22. The use of an antifriction facing on the guide tube 22 or the formation of the latter from material with a low coefficient of friction tends to reduce or minimise the generation of heat by such rubbing. Excessive heating of the filament is undesirable because it impairs the physical strength of the filament and may cause the latter to melt.

The construction of head 9 described above is simpler and cheaper to manufacture than the prior art construction in which filament is fed along the hollow armature shaft. In addition, the construction enables the head 9 to be rotated at a speed different from that of the driving motor.

It will be appreciated that the cutter head may be driven from the motor via a drive transmission other than a belt drive, for example a gear train could be used or a friction drive.

In addition, it is possible to incorporate a joint between the unit 1 and the shaft 8 or to construct the unit 1 in two parts jointed together to enable the inclination of the shaft relatively to the unit 1 to be varied. Adjustment of that inclination enables a user more easily to trim vegetation etc. beneath bushes and lower branches of trees.

I claim:

1. A vegetation cutter, comprising:
   a housing;
   a handle shaft extending upwardly from said housing and having a handle at an upper end;
   a supply of flexible filament supported on said shaft;
   a base plate in said housing;
   a motor mounted on said base plate, a drive shaft of said motor extending downwardly through said base plate and having a pulley mounted on a lower end thereof;
   a spindle having a central bore therethrough, said spindle being rotatably mounted in said base plate at a location spaced from said drive shaft, and said spindle extending downwardly from said base plate;
   a pulley mounted on said spindle below said base plate and connected by a belt to said drive shaft pulley for rotation thereby;
   a hollow guide tube connected to a lower end of said spindle for rotation therewith, said guide tube having one end aligned and in communication with said bore and another end directed transversely away from said bore; and
   means for guiding flexible filament from said supply to said bore to enable a cutting end portion of said filament to extend from said another end of said guide tube.

2. The vegetation cutter of claim 1, wherein said drive shaft is rotatably mounted in a bearing supported in said base plate.

3. The vegetation cutter of claim 2, wherein said spindle is rotatably mounted in another bearing supported in said base plate.

4. The vegetation cutter of claim 1, wherein said drive shaft and said spindle have parallel axes of rotation, and said bore extends along the axis of rotation of said spindle.

5. The vegetation cutter of claim 1, wherein said guide tube is curved and contained in a driving head mounted on said spindle.

6. The vegetation cutter of claim 1, wherein said guiding means comprises a second guide tube in said housing extending upwardly away from said base plate, a lower end of said second guide tube being aligned with an upper end of said bore.

7. The vegetation cutter of claim 6, wherein an upper end of said second guide tube is located outside said housing to one side of and adjacent said handle shaft.

8. The vegetation cutter of claim 7, wherein said supply comprises a reel disposed between said handle and said housing, and said guiding means enables passage of said flexible element outside said handle from said reel to said second guide tube upper end.

9. The vegetation cutter of claim 6, wherein said second guide tube is spaced from and extends past said motor.

10. The vegetation cutter of claim 1, wherein said pulleys are of different size whereby said hollow guide tube rotates at a different speed to said drive shaft.

11. The vegetation cutter of claim 10, wherein said spindle is of larger diameter than said drive shaft pulley.

12. The vegetation cutter of claim 10, further comprising a motor cooling fan mounted on said drive shaft above said base plate.

13. A vegetation cutter, comprising:
a handle shaft by which the vegetation cutter is manually manipulated in use;
a base plate connected to said shaft;
a motor mounted above said base plate, a drive shaft of said motor being rotatable about an axis extending transversely to said base plate;
a spindle mounted through said base plate for rotation about an axis parallel to but spaced from said drive shaft axis;
said spindle having a bore therethrough extending along said spindle axis;
a curved guide tube connected to said spindle for rotation therewith and having an upper end aligned with and in communication with a lower end of said bore, a lower end of said guide tube extending transversely away from said spindle axis;
transmission means, connected between said drive shaft and said spindle, for rotation of said spindle by said drive shaft;
means, connected to said handle shaft and located above said motor, for storing and supplying flexible filament; and
means for guiding the flexible filament from said storing and supplying means to an upper end of said bore with said filament passing outside said motor.

14. The vegetation cutter of claim 13, further comprising a housing in which said base plate and said motor are mounted and from which said handle shaft extends.

15. The vegetation cutter of claim 14, wherein said guiding means comprises an elongate guide tube extending through the interior of said housing, a lower portion of said elongate guide tube extending between said motor and a wall of said housing.

16. The vegetation cutter of claim 13, wherein said transmission means comprises pulleys mounted on said drive shaft and said spindle and drivingly connected by a belt, said motor is an electric motor, and the drive shaft pulley is smaller than said spindle pulley.

17. The vegetation cutter of claim 16, wherein said pulleys and said belt are located below said base plate, and said motor is mounted on said base plate with said drive shaft axis at right angles to said base plate.

18. The vegetation cutter of claim 13, wherein said guide tube has an operative surface formed of a material having a low coefficient of friction to reduce friction between said guide tube and said flexible filament.

19. A vegetation cutter, comprising:
a housing;
a handle shaft extending upwardly from the housing and having a first handle at an upper end;
a second handle mounted on said handle shaft between said housing and said first handle;
a reel of flexible filament accommodated in said second handle, flexible filament being fed therefrom through an eyelet in said second handle;
means for controlling feeding of the filament from said reel;
a base plate mounted in and extending transversely across said housing;
an electric motor mounted on said base plate and extending upwardly therefrom inside said housing, a drive shaft of said motor passing through a bearing mounted in said base plate, said drive shaft extending downwardly through and below said base plate and being rotatable about a first axis perpendicular to said base plate;
a first pulley secured on said drive shaft below said base plate;
a spindle mounted in a second bearing in said base plate, said spindle being rotatable about a second axis parallel to and spaced from said first axis, said spindle having a bore therethrough extending along said second axis;
a driving head mounted on said spindle below said base plate, and having a curved guide tube therein, an upper end of said guide tube being aligned with and in communication with a lower end of said bore, a lower end of said guide tube extending transversely away from said second axis;
a second pulley mounted on said spindle below said base plate and connected to said first pulley by a belt;
an elongate second guide tube located in said housing to one side of said motor;
a lower end of said second guide tube being aligned with an upper end of said bore; and
an upper end of said second guide tube extending upwardly out of said housing at a location alongside said handle shaft, said flexible filament extending alongside said shaft from said eyelet to said upper end of the second guide tube.

20. A vegetation cutter, comprising:
a housing;
a handle shaft extending upwardly from said housing for manual manipulation of the vegetation cutter;
means for supporting a reel of flexible filament;

a spindle mounted in said housing and rotatable about a spindle axis;

said spindle having a bore therethrough extending along said spindle axis;

a drive head connected to said spindle for rotation therewith and having a curved passage therethrough, an inlet end of said passage communicating with a lower end of said bore, and an outlet end of said passage extending transversely away from said spindle axis;

an electric motor mounted in said housing and having a drive shaft rotational about a motor axis;

said motor being disposed to one side of said spindle, and said motor axis being separate and distinct from said spindle axis;

transmission means, connected between said drive shaft and said spindle, for transmitting drive from said motor to said spindle with said spindle being rotated at a different speed to that of said drive shaft; and guide means for guiding flexible filament along a path from said reel to an upper end of said bore with said path extending through said housing to one side of said motor.

21. The vegetation cutter of claim 20, wherein:

said supporting means is mounted on said handle shaft;

said motor axis is parallel to said spindle axis; and said guide means comprises a guide tube, a lower end of said guide tube being aligned with said bore, and an upper end of said guide tube extending upwardly out of said housing; and further comprising:

means for controlling feeding of the filament from the reel to the drive head to permit said feeding to occur in predetermined lengths.

* * * * *